Patented Apr. 7, 1942

2,278,867

UNITED STATES PATENT OFFICE 2,278,867

LEAD-FREE GLAZE OF LOW MATURING TEMPERATURE FOR USE IN DECORATING CERAMIC WARE

Alden J. Deyrup, Elizabeth, N. J., assignor to E. I. du Pont de Nemours & Company, Wilmington, Del., a corporation of Delaware No Drawing. Application May 1, 1940,
Serial No. 332,732

9 Claims. (Cl. 106—48)

This invention relates to certain improved lead-free glazes or fluxes of the type suitable for use in art-glazing or overglazing ceramic ware. More particularly, this invention relates to certain new and improved flux compositions free from lead oxide which, when used for the artglazing or overglazing of chinaware and pottery, are capable of melting at fairly low maturing temperatures to a superior decorative coating of high resistance to both the action of chemical agents such as acids and alkalies, and to mechanical abrasion.

In the manufacture of china and pottery a clay mixture is customarily formed into the desired shape and then fired at a high temperature, one within the range 1250 to 1400° C. being ordinarily employed. The product resulting from this first firing is known as bisque. The bisque, while hard, is more or less porous in structure. Moreover, the surface is generally rough and devoid of glossiness.

In manufacturing chinaware and pottery from bisque, bisque is usually coated with a glaze composition. This can readily be done by dipping or spraying the bisque with an aqueous suspension of the flux or glaze composition, and then subjecting the coated product to a second firing. The second firing, usually carried out at a fairly high temperature but one below the temperature of bisque firing, temperatures of 1100 to 1300° C. being common, causes the glaze to melt or mature on the ware and form a smooth, vitreous surface coating. The ceramic ware is often colored by means of a pigment dispersed in this glaze slip or suspension which is fired on the bisque. A pigment utilized for this purpose is ordinarily referred to as a glaze stain, and a reasonably uniform color over the entire body can readily be secured by suspending a suitable pigment in the glaze composition.

It is also possible to decorate the ceramic ware with a colored decorative surface coating by overglaze color application. A mixture of the pigment in a flux of a relatively low maturing temperature, known in the art as an overglaze color, may be applied over the glaze formed on the bisque by the first or glaze firing. This overglaze composition, suspended in a suitable vehicle, may of course be applied to the bisque body coated with the glaze composition by spraying, brushing, or by any other convenient method employed in the art for coating ceramic ware with glaze compositions. The ware is then fired at a relatively low temperature, one lower than either the temperature of bisque firing, or the temperature of glaze firing, being utilized. The temperature employed in the overglazing fire to mature the overglaze is usually 700 to 800° C., which is of course considerably lower than the temperature range in which the glazes used to coat the bisque are fired. At this overglaze firing temperature the colored decorative coating matures and vitrifies, and the ware is thus coated with a colored decorative surface having a high degree of glossiness.

Bisque ware is sometimes decorated by placing on the surface of the ware, without preliminarily coating the surface of the bisque with a vitrified glaze, a mixture of pigment and low-melting flux which can be matured to a good gloss in the overglazing fire and at the temperature of overglazing. The colored flux composition may be applied by dipping the bisque in the mixture of pigment and low-melting flux, or any other method such as spraying the bisque ware with the composition may be employed to coat the bisque surface, in accordance with procedures which are now well understood in the manufacture of chinaware and pottery. This type of decoration is often called "artglazing," and the term artglaze ordinarily signifies a vitrifiable color composition which can be applied directly to bisque ware (without intermediate glazing) and matured in a decorating kiln to a colored glossy decorative coating at the same temperatures used to mature overglaze decorative coatings, 700 to 800° C.

The use of a glaze stain in a glaze for forming a decorative coating on bisque ware will result in an article similar to ware coated by the use of an artglaze on bisque. Both methods of decorating are capable of producing ceramic ware formed with a uniformly colored vitreous layer over the entire surface of the article. The principal advantage accruing to the use of an artglaze, as compared with the decoration of bisque ware by means of a glaze pigmented with a glaze stain, results from the fact that lower fusion temperatures may be employed in artglazing and this permits the use of some pigments, chiefly the cadmium red pigments, which are unstable at the higher firing temperatures required to mature a regular glaze on the bisque. Decorating the ware by means of an artglaze gives the manufacturer a wider palette and permits the use of more brilliant colors. Another advantage inherent in the use of artglazes as contrasted with regular glazes is that breakage occurs much less frequently at the temperatures employed in overglazing than at the higher temperatures employed in the glaze fire. This reduction in the occurrence of breakage results in substantial reduction in the number of unsatisfactory products, known in the industry as "rejects."

While the artglazes possess certain advantages over regular glazes, they have also had some disadvantages as compared with the higher-melting glaze compositions which are applied to bisque when that product is coated with the regular glaze. The chief disadvantage of overglazes has been, in the past, their lack of resistance to the action of acids, as well as the necessity for including lead oxide in the composition in order to secure a suitable maturing temperature. It has been considered essential to have lead oxide present in such glaze compositions in order that the desired low fusion or maturing temperatures might be secured. As a result the glazes have been more or less soluble in various liquids such as fruit acids, and when the decorated ware has been used for holding food this lead solubility has constituted a menace to health. Moreover, it has been very difficult to secure a glaze having satisfactory expansion characteristics when lead oxide is present in such artglaze compositions.

Artglazes which do not craze immediately after firing, or on ageing, have, in the past, had such inconveniently high fusion temperatures as to prevent their practical utilization in overglazing bisque ware. In commercial pottery manufacturing the kilns are ordinarily operated only at three temperatures: the temperature of bisque firing; the temperature of glaze firing; and the temperature of decorating or overglaze firing. The use for decorative purposes of glaze compositions maturing at temperatures other than those within the ranges of the three types of kilns has been exceedingly inconvenient and impractical, especially in large scale manufacturing operations. Another disadvantage of artglazes as previously known to the art has been the low resistance of the decorative surface coating to abrasion or scratching.

It is principally because of the above disadvantages that the artglazes are not now in wide use in the manufacture of ceramic ware. At present the use of artglazes is restricted principally to the production of decorative coatings of certain hues which cannot be produced at all with ordinary glazes since the pigments are not stable at the higher temperatures used to mature such regular glazes. Among such hues are the various hues of red produced by the presence of cadmium pigments such as the various cadmium sulfoselenide pigments in the glaze composition.

Accordingly, it is one of the objects of this invention to prepare improved artglaze compositions which can be applied to the bisque ware at the low temperatures used for overglazing but which glaze compositions are free from lead compounds. The resulting decorative surface coating on the bisque ware thus introduces no problem when the ware is utilized for holding foodstuffs. Another object of this invention is the preparation of an improved artglaze, maturing in the ordinary decorating temperature range, which composition will not devitrify, chip or craze immediately after firing or upon ageing, even under those circumstances where the glaze is applied directly to commercial bisque bodies without intermediate glazing. Still another object of this invention is the production of artglazes of satisfactory resistance to the action of acids and of high resistance to abrasive action. These and still other objects of my invention will be apparent from the ensuing disclosure of certain improved embodiments thereof.

My improved glaze compositions, suitable for use as artglaze fluxes, are characterized by the absence of lead oxide and by the fact that while compounds of lead are not present therein the glazes nevertheless mature to glossy decorative coatings at the low temperatures used in overglazing. While fluxes and glazes which contain no lead oxide are already known to the art, such compositions in the past have either had very high melting points or coefficients of expansion too high to permit application of the glaze, even in a very thin layer, on top of chinaware which had been previously covered with the usual decorative glaze. Among the lead-free glazes known to the ceramic arts before my discovery are many china glazes which mature to decorative coatings at relatively elevated temperatures, such as 1100 to 1300° C. Many sheet steel enamels now used for decorating sheet metal surfaces do not contain oxides of lead, but these enamels mature at temperatures of about 800° C., which temperatures are very close to the upper end of the china decorating maturing temperature range. Moreover, these sheet steel enamels craze and chip off to a very serious extent if applied to china or pottery bases.

While many artglaze fluxes and overglaze fluxes are to some extent interchangeable because they mature within substantially the same temperature range, the properties of fluxes utilized for artglaze decorative purposes ordinarily differ somewhat from those of flux compositions employed in overglaze decoration. Any substantial difference between the coefficient of expansion of the flux composition and the coefficient of expansion of the bisque is more likely to result in crazing when the material is fired directly on the bisque than when a layer of glaze intervenes. For this reason the coefficient of expansion of glaze compositions utilized as artglazes is more critical and must correspond more closely to that of the bisque than is necessary in the case of compositions used for overglazing. The improved glazes maturing at a relatively low temperature with which this invention is concerned may be used both as artglazes, and as overglazes for decorating ware which has already been preliminarily coated with a vitreous glaze composition.

I have found that a lead-free flux composition having the improved properties specified must contain the oxides of the elements silicon, boron, aluminum, and lithium, and at least one of the alkali metal oxides of the group including sodium oxide and potassium oxide. Moreover, these oxides must be present in the flux composition within certain relatively narrow percentage ranges, which ranges may be specified as follows:

| | Per cent |
|---|---|
| Silica, $SiO_2$ | 40 to 60 |
| Boric oxide, $B_2O_3$ | 20 to 40 |
| Aluminum oxide, $Al_2O_3$ | 5 to 15 |
| Lithium oxide, $Li_2O$ | 1 to 2.5 |
| Potassium oxide or sodium oxide ($K_2O$ or $Na_2O$); or a mixture of the two alkali metal oxides ($K_2O$ and ($Na_2O$) | 2 to 6 |

These percentages are by weight, based on the total weight of the flux composition.

The oxides listed in the above table may be regarded as the essential elements, and must be present in the flux composition in the amounts therein specified. However, other additional elements may be present in minor amount, and in many instances it may be desirable to incorporate such additional ingredients in order to secure special effects or improved properties. For example, a few percent of cadmium oxide, CdO, amounts ranging from 2% to 7% of the total composition being suitable, may be included in the flux composition for the purpose of improving the stability of colors resulting from the inclusion of cadmium sulfide and of the cadmium sulfoselenides in the flux composition. Zirconium oxide in small quantity, amounts comprising from 1 to 7% by weight of the flux composition being suitable, may also be added to the batch composition and melted into clear and homogeneous solution for the purpose of improving the resistance of the resulting glaze composition to the action of alkalies. Glazes including zirconium oxide melted into the flux composition are described in my copending application Serial No. 141,188, filed May 6, 1937.

The flux composition may also contain zinc oxide, present to the extent of a few percent, by weight, based on the total weight of the composition. Amounts up to about 5% by weight may be present. The presence of zinc oxide in the glaze serves to improve the brilliance and gloss of the resulting decorative coating. In all cases, however, the glaze composition must contain the oxides of aluminum, boron, silicon, lithium, and one or more of the oxides of the alkali metals sodium and potassium, and these ingredients must be present in the above specified proportions.

The presence of lithium oxide melted into the glaze composition serves to reduce the melting point of the flux so that the resulting vitrifiable composition matures at a relatively low fusion temperature. However, lithium oxide cannot be employed as the only alkali metal oxide in the glaze composition, or devitrification during firing will occur to a deleterious extent. Either sodium oxide, $Na_2O$, or potassium oxide, $K_2O$, may be incorporated with lithium oxide as the alkali metal oxides in the flux composition, but for best results it is preferred to have present the oxides of all three alkali metals, i. e., lithium oxide, sodium oxide, and potassium oxide, these oxides being present in approximately equal weight percents.

It has been observed that the oxides of the alkaline earth metals, i. e., the oxides of the metals magnesium, calcium, strontium, and barium, have detrimental properties when incorporated in the flux composition and interfere seriously with the obtainment of the desired low-maturing temperatures. For this reason my improved lead-free artglaze compositions, suitable also for use in overglazing, do not contain the oxides of the alkaline earth metals in any substantial amount. Under some circumstances, however, amounts up to 4% may not be detrimental.

When the oxides specified and in the proportions stated are included in my improved glaze compositions it is noteworthy that these fluxes when applied as artglazes to bisque bodies result in vitrified decorative coatings having substantially no tendency to devitrification. This surprising lack of tendency to devitrify is indeed remarkable, as ordinarily the glazes which are free from both lead oxide and the oxides of the alkaline earth metals have a pronounced tendency to devitrification which renders them unsatisfactory for commercial glaze decorative purposes.

My improved glaze compositions, suitable for artglazing or overglazing, thus differ markedly from most of the glass and pottery glazes now known to the art in that they are characterized by a high content of boric oxide. As they do not include either oxides of lead or of the alkaline earth metals they are thus distinguished from all glass compositions and from the various glazes of this type now known to the art. They may be distinguished from all glass enamels and from the usual artglaze and overglaze fluxes as now known to the ceramic art by their high content of alumina, as well as by their freedom from lead oxide. In spite of the high content of boric oxide, and high ratio of boric oxide to silica in my improved glaze compositions, they are remarkably resistant to the action of acids. It is even more surprising that they possess fusion temperatures sufficiently low to permit them to mature in the overglazing range, and that this low maturing temperature is secured concomitantly with a low coefficient of expansion, since my improved flux compositions do not contain lead.

Some typical and preferred batch compositions suitable for preparing the improved glaze compositions with which this invention is concerned are give in Table I. These compositions are lettered A to E, and Table II lists calculated melted compositions of the glazes produced by melting the batch compositions given in Table I. In both tables the figures represent percent by weight based on the total weight of the batch composition or total weight of the melted flux composition.

TABLE I

Batch compositions suitable for preparing improved lead-free glazes

|  | Comp. A | Comp. B | Comp. C | Comp. D | Comp. E |
|---|---|---|---|---|---|
| Boric acid, $H_3BO_3$ | 32.8 | 27.7 | 42.4 | 39.4 | 26.7 |
| Flint, $SiO_2$ | 32.2 | 32.2 | 27.5 | 25.6 | 34.6 |
| Lithium carbonate, $Li_2CO_3$ | 4.0 | 3.7 | 3.2 | 2.9 | 4.0 |
| Kaolin, $Al_2O_3.2SiO_2.2H_2O$ | 13.2 | 16.5 | 14.1 | 13.1 | 26.7 |
| Potassium carbonate, $2K_2CO_3.3H_2O$ | 2.0 | 2.5 | 5.0 | -------- | 4.0 |
| Borax, $Na_2B_4O_7.10H_2O$ | 6.6 | 8.3 | -------- | 11.8 | -------- |
| Zinc oxide, ZnO | 3.3 | 6.6 | 5.7 | 5.2 | -------- |
| Sodium zirconium silicate, 14% $Na_2O$, 29% $SiO_2$, 55% $ZrO_2$ | 2.0 | 2.5 | 2.1 | 2.0 | -------- |
| Cadmium oxide, CdO | 3.9 | -------- | -------- | -------- | -------- |
| Sodium nitrate, $NaNO_3$ | -------- | -------- | -------- | -------- | 4.0 |

TABLE II

Calculated compositions of improved lead-free glazes

|  | Flux A | Flux B | Flux C | Flux D | Flux E |
|---|---|---|---|---|---|
| $B_2O_3$ | 27.0 | 23.8 | 31.6 | 36.0 | 19.3 |
| $SiO_2$ | 50.3 | 51.8 | 46.0 | 43.8 | 60.3 |
| $Li_2O$ | 2.1 | 1.9 | 1.7 | 1.6 | 2.1 |
| $Al_2O_3$ | 6.7 | 8.3 | 7.4 | 7.0 | 13.5 |
| $K_2O$ | 1.5 | 1.8 | 3.8 | -------- | 2.9 |
| $Na_2O$ | 1.8 | 2.2 | 0.4 | 3.0 | 1.9 |
| ZnO | 4.2 | 8.4 | 7.6 | 7.1 | -------- |
| $ZrO_2$ | 1.4 | 1.8 | 1.5 | 1.5 | -------- |
| CdO | 5.0 | -------- | -------- | -------- | -------- |

In order to prepare the flux compositions of Table II from the batch compositions of Table I, the ingredients necessary to make up the batch are carefully weighed out, and mixed thoroughly. The batch is then melted, preferably in a crucible or rotary furnace, at a temperature of 1200 to 1300° C. until complete melting occurs. Fusion is continued until the melt is clear and transparent throughout. The exact conditions under which melting is carried out are not critical, nor is it necessary to use the particular raw material sources or chemical compounds given in Table I in order to introduce the ingredients present in the calculated melted compositions given in Table II. Other suitable sources of the oxidic ingredients of the flux may of course be utilized. After melting, the melt can be conveniently fritted by pouring it into water.

In preparing colored artglazes and overglazes suitable for use in application to bisque ware, the flux composition is ground to a fine state of subdivision with a suitable ceramic pigment. The grinding is conveniently carried out in water, acetone, or in any other liquid. The grinding conditions are essentially the same as those employed in grinding ordinary artglaze and overglaze colors, except that the period of grinding must ordinarily be about twice the length of time now required to reduce the usual artglaze or overglaze to a similar state of fine subdivision. The longer period is required to grind my improved fluxes to an equal fineness because of their greater mechanical hardness and toughness.

When it is desired to pigment the improved fluxes with cadmium sulfoselenide red pigments it is preferable to grind the flux with the pigment, sinter the mixture, and then grind again. The sintering operation, which consists in bringing the fine color just to a condition of fusion in a furnace preferably held at a temperature within the range 600 to 800° C., has the effect of augmenting the brightness and stability of the resulting red artglaze or overglaze.

As examples of my improved colored glaze compositions, suitable for use as artglazes or as overglazes, and as illustrative of the methods by which these fluxes may be prepared, the following may be given:

Example 1

A flux having the calculated composition given for flux A in Table II was prepared from the batch ingredients tabulated under composition A in Table I. After thorough admixture of the ingredients comprising the batch, the melt was charged into a crucible and melted, a temperature of 1200 to 1300° C. being employed. Fusion was continued until the fused product was entirely clear and transparent. The melt was then poured into water and fritted in the usual manner.

95 parts of the flux were then mixed with 5 parts of cadmium sulfoselenide red pigment. The mixture was reduced to a fine state of subdivision by grinding in water, and then dried. It was then sintered at a temperature of 750° C. The sintered enamel was crushed, reduced to a fine state of subdivision by grinding in acetone, and again dried. The resulting colored glaze composition was suitable for use in applying artglazes or overglazes to bisque ceramic ware for forming therein a red, glossy, decorative surface coating.

Bisque ware was coated with a suspension of the fine artglaze in water. In preparing the suspension of the glaze in water, 4% of ammonium hydroxide (commercial aqua ammonia solution of specific gravity 0.90) and 1% casein were first added to the water in order to improve the working properties of the resulting suspension and to retard settling out of the solid particles in the suspension.

The suspension of glaze in the aqueous vehicle was readily applied to the bisque to be coated by dipping, but could also be applied by spraying or by any other suitable method. The ware was then fired in the overglazing fire at a temperature of 700 to 800° C. The resulting product was ceramic ware coated with a red, glossy, decorative coating. The colored decorative coating had a high resistance to the action of acids, satisfactory resistance to abrasion, and there was no evidence of crazing or chipping anywhere on the vitreous surface.

Example 2

Flux B of Table II, having the calculated composition given in that table, was prepared from batch composition B of Table I. After the ingredients comprising the batch composition were weighed out and thoroughly mixed, the batch was melted in a rotary furnace at a temperature of 1200 to 1300° C. Melting was continued until the melt was entirely clear and transparent. The melted glaze composition was then poured into water in order to secure a fritted product in the manner now well understood in the art.

To 93 parts of flux B of Table II there were added 6 parts of cobalt aluminate blue pigment and 1 part of tin oxide opacifier. The resulting mixture was ground to a fine state of subdivision in water. It was then suitable for direct application to bisque ware for artglazing or as an overglaze.

The colored flux composition was suspended in water containing about 4% ammonium hydroxide (commercial solution of specific gravity 0.90) and 1% of casein. Bisque ware was then coated with the suspension of the glaze by spraying the ware with the suspension. The product was fired in the overglazing fire at a temperature of 700 to 800° C. and a blue vitrified decorative surface coating was secured. The resulting coating had satisfactory resistance to abrasion and was highly acid-resistant. The decorative coating was entirely free from crazing and chipping, and since it contained no compound of lead, presented no danger to health even when the resulting article was used for holding food products.

It will be apparent that while I have described certain improved embodiments of my improved lead-free glaze compositions, suitable for use in artglazing or overglazing and applicable to bisque at the usual temperature at which overglazing firing is carried out, many changes and modification may be made in the preferred embodiments disclosed without departing from the spirit or scope of my invention. Accordingly, the scope of my invention is to be construed in accordance with the prior art and appended claims, and it is not to be restricted to the various conditions and proportions referred to merely as illustrative of preferred embodiments of my invention.

I claim:

1. A lead-free vitrifiable ceramic glaze composition which comprises silica in amounts ranging from 40–60%, boric oxide present in amounts ranging from 20–40%, aluminum oxide present is amounts ranging from 5–15%, lithium oxide present in amounts ranging from 1–2.5%, and an alkali metal oxide selected from the group which consists of sodium oxide and potassium oxide, said alkali metal oxide being present in amounts ranging from 2–6%, all percentages being by weight based on the total weight of said glaze composition.

2. A pigmented lead-free ceramic glaze composition, suitable for use in overglazing or as an artglaze, which comprises a ceramic pigment and a fritted vitrifiable glaze composition having the following composition: silica in amounts ranging from 40–60%, boric oxide in amounts ranging from 20–40%, aluminum oxide in amounts ranging from 5–15%, lithium oxide in amounts ranging from 1–2.5%, and an alkali metal oxide selected from the group which consists of sodium oxide and potassium oxide in amounts ranging from 2–6%, all parts being by weight based on the total weight of said fritted glaze composition.

3. A lead-free vitrifiable ceramic glaze composition which comprises silica in amounts ranging from 40–60%, boric oxide in amounts ranging from 20–40%, aluminum oxide present in amounts ranging from 5–15%, lithium oxide present in amounts ranging from 1–2.5%, an alkali metal oxide selected from the group consisting of sodium oxide and potassium oxide in amounts ranging from 2–6%, and cadmium oxide present in amounts sufficient to improve the stability of the color of the glaze composition resulting when said vitrifiable composition is pigmented by the addition of suitable ceramic pigments.

4. A lead-free vitrifiable ceramic composition which comprises silica in amounts ranging from 40–60%, boric oxide in amounts ranging from 20–40%, aluminum oxide in amounts ranging from 5–15%, lithium oxide in amounts ranging from 1–2.5%, an alkali metal oxide selected from the group which consists of sodium oxide and potassium oxide in amounts ranging from 2–6%, zirconium oxide present in amounts ranging from 1–7%, said zirconium oxide being present dissolved in the glaze, all percentages being by weight based on the total weight of said glaze composition.

5. A lead-free vitrifiable ceramic glaze composition which comprises silica present in amounts ranging from 40–60%, boric oxide present in amounts ranging from 20–40%, aluminum oxide present in amounts ranging from 5–15%, lithium oxide present in amounts ranging from 1–2.5%, an alkali metal oxide selected from the group which consists of sodium oxide and potassium oxide in amounts ranging from 2–6%, cadmium oxide in amounts ranging from 2–7%, and a small amount of a red ceramic pigment selected from the group which consists of cadmium sulphide and cadmium sulfoselenides, all parts being by weight based on the total weight of said glaze composition.

6. A lead-free vitrifiable ceramic glaze composition which comprises silica present in amounts ranging from 40–60%, boric oxide present in amounts ranging from 20–40%, aluminum oxide present in amounts ranging from 5–15%, lithium oxide present in amounts ranging from 1–2.5%, an alkali metal oxide selected from the group consisting of sodium oxide and potassium oxide in amounts ranging from 2–6% and zinc oxide in amounts ranging up to 5%, all parts being by weight based on the total weight of said glaze composition.

7. A lead-free vitrifiable ceramic glaze composition which comprises silica present in amounts ranging from 40–60%, boric oxide present in amounts ranging from 20–40%, aluminum oxide present in amounts ranging from 5–15%, lithium oxide present in amounts ranging from 1–2.5%, an alkali metal oxide selected from the group which consists of sodium oxide and potassium oxide in amounts ranging from 2–6% and zinc oxide present in amounts ranging up to 5%, all parts being by weight based on the total weight of said glaze composition, alkaline earth metal oxides being substantially completely absent from said glaze composition.

8. A lead-free vitrifiable ceramic glaze composition which comprises silica present in amounts ranging from 40–60%, boric oxide present in amounts ranging from 20–40%, aluminum oxide present in amounts ranging from 5–15%, lithium oxide present in amounts ranging from 1–2.5%, an alkali metal oxide selected from the group which consists of sodium oxide and potassium oxide in amounts ranging from 2–6% and zinc oxide present in amounts ranging up to 5%, all parts being by weight based on the total weight of said glaze composition, alkaline earth metal oxides being present in amounts not exceeding 4% by weight of said glaze composition.

9. A decorated ceramic article which comprises a fired clay body decorated with a pigmented lead-free vitrifiable ceramic glaze composition which comprises silica present in amounts ranging from 40–60%, boric oxide present in amounts ranging from 20–40%, aluminum oxide present in amounts ranging from 5–15%, lithium oxide present in amounts ranging from 1–2.5%, and an alkali metal oxide selected from the group which consists of sodium oxide and potassium oxide in amounts ranging from 2–6%, all percentages being by weight based on the total weight of said decorated glaze composition.

ALDEN J. DEYRUP.